United States Patent [19]

Fenelon

[11] Patent Number: 5,653,144
[45] Date of Patent: Aug. 5, 1997

[54] STRESS DISSIPATION APPARATUS

[76] Inventor: Paul J. Fenelon, 13 Inverary, Nashville, Tenn. 37215

[21] Appl. No.: 545,997

[22] Filed: Oct. 20, 1995

Related U.S. Application Data

[63] Continuation-in-part of Ser. No. 488,344, filed as PCT/US94/01577 Feb. 9, 1994, and a continuation-in-part of Ser. No. 160,544, Dec. 1, 1993, Pat. No. 5,452,622, which is a continuation-in-part of Ser. No. 15,332, Feb. 9, 1993, Pat. No. 5,307,705.

[51] Int. Cl.$^6$ .............................. F16D 3/68; F16H 55/14; F16H 1/16
[52] U.S. Cl. .............................. 74/411; 49/342; 49/349; 74/89.14; 74/89.18; 74/425; 74/447; 74/606 R; 192/150; 318/474; 464/75
[58] Field of Search .............................. 74/89.14, 89.18, 74/446, 447, 425, 606 R; 49/342, 349; 192/150; 318/474, 476; 464/74, 75

[56] References Cited

U.S. PATENT DOCUMENTS

| | | |
|---|---|---|
| Re. 34,105 | 10/1992 | Flotow et al. . |
| 284,290 | 9/1883 | Gilliland . |
| 287,711 | 10/1883 | Ortman . |
| 288,134 | 11/1883 | Stone, Jr. . |
| 312,780 | 2/1885 | Wilcox . |
| 314,472 | 3/1885 | Plamondon . |
| 379,022 | 3/1888 | Morgan . |
| 486,068 | 11/1892 | Allington .............................. 464/74 X |
| 680,654 | 8/1901 | Gomber . |
| 820,789 | 5/1906 | Hutchins . |
| 1,060,865 | 5/1913 | Sundh . |
| 1,265,811 | 5/1918 | Ohlson . |
| 1,424,203 | 8/1922 | Keller . |
| 1,589,795 | 6/1926 | Emrich . |
| 1,674,226 | 6/1928 | Reed . |
| 1,750,827 | 3/1930 | Wemp . |
| 1,757,517 | 5/1930 | Eaton . |
| 1,780,727 | 11/1930 | Tenney . |
| 1,913,525 | 6/1933 | Valentine et al. . |
| 1,925,278 | 9/1933 | Paton . |
| 1,928,763 | 10/1933 | Rosenberg . |
| 1,967,322 | 7/1934 | Pearmain . |
| 2,004,712 | 6/1935 | Thiry . |

(List continued on next page.)

FOREIGN PATENT DOCUMENTS

| | | |
|---|---|---|
| 1260082 | 3/1961 | France .............................. 464/73 |
| 3-197232A | 8/1991 | Japan . |
| 4-282053A | 10/1992 | Japan . |
| 950994 | 8/1982 | U.S.S.R. .............................. 464/75 |
| 682196 | 11/1952 | United Kingdom . |
| 759215 | 10/1956 | United Kingdom . |
| 792330 | 3/1958 | United Kingdom . |
| 989898 | 4/1965 | United Kingdom . |

OTHER PUBLICATIONS

Machine Design—Basics of Design Engineering, "Components for drivelines", Jun. 1992, pp. 92–96.
Photographs of sunroof motor (prior to Jun. 7, 1995).
Photographs of window lift motor having three elastomeric inserts (prior to Dec. 1, 1993).
Photographs of window lift motor having a rim, web, hub and elastomeric material (prior to Dec. 1, 1993).

*Primary Examiner*—Allan D. Herrmann
*Attorney, Agent, or Firm*—Harness, Dickey & Pierce, P.L.C.

[57] ABSTRACT

A rotatable apparatus includes a pair of rotatable members joined by a stress dissipating structure. The stress dissipating structure can be employed in a gear, sprocket, clutch or the like. In one embodiment of the present invention, antibuckling plates generally spanning between a hub and rim define a hollow cavity. In another embodiment of the present invention, the stress dissipating structure includes a specifically configured sets of nodules moving the hub and rim. An additional aspect of the present invention provides a stress dissipating structure employing various anti-buckling plate attachment constructions. In still another embodiment of the present invention, a uniquely sized and packaged gear, gear housing and/or motor are employed in order to maximize output force per pound of material efficiencies.

41 Claims, 4 Drawing Sheets

U.S. PATENT DOCUMENTS

| | | |
|---|---|---|
| 2,049,133 | 7/1936 | Pierce . |
| 2,105,188 | 1/1938 | Guy . |
| 2,118,913 | 5/1938 | Bachman . |
| 2,157,211 | 5/1939 | McDonald . |
| 2,162,071 | 6/1939 | Eason . |
| 2,182,387 | 12/1939 | Probst . |
| 2,187,706 | 1/1940 | Julien . |
| 2,260,869 | 10/1941 | Ruesenberg . |
| 2,301,600 | 11/1942 | Wilson . |
| 2,306,539 | 12/1942 | Jones . |
| 2,307,129 | 1/1943 | Hines et al. . |
| 2,325,193 | 7/1943 | Nutt et al. . |
| 2,380,776 | 7/1945 | Miller . |
| 2,400,586 | 5/1946 | Zimmermann . |
| 2,460,630 | 2/1949 | Fawick . |
| 2,560,644 | 7/1951 | Hartzell . |
| 2,591,734 | 4/1952 | Smith et al. . |
| 2,702,995 | 3/1955 | Biedess . |
| 2,753,731 | 7/1956 | McWethy . |
| 2,857,777 | 10/1958 | Porter . |
| 2,869,388 | 1/1959 | Kreis . |
| 2,904,150 | 9/1959 | Sand . |
| 2,939,331 | 6/1960 | Weeks . |
| 2,955,481 | 10/1960 | Jackel . |
| 2,956,187 | 10/1960 | Wood . |
| 2,961,856 | 11/1960 | Selzer . |
| 2,998,114 | 8/1961 | Altmann . |
| 3,020,036 | 2/1962 | Kleinschmidt . |
| 3,057,220 | 10/1962 | Parr . |
| 3,071,850 | 1/1963 | Haushalter . |
| 3,076,352 | 2/1963 | Larsh . |
| 3,078,206 | 2/1963 | Skura . |
| 3,167,975 | 2/1965 | Durand . |
| 3,171,270 | 3/1965 | Dahlberg . |
| 3,216,267 | 11/1965 | Dolza . |
| 3,218,828 | 11/1965 | Thelander . |
| 3,223,214 | 12/1965 | Kuivinen . |
| 3,236,347 | 2/1966 | Puls et al. . |
| 3,245,508 | 4/1966 | Livezey . |
| 3,257,860 | 6/1966 | Runde et al. . |
| 3,265,172 | 8/1966 | Atsumi et al. . |
| 3,283,864 | 11/1966 | Motsch . |
| 3,304,795 | 2/1967 | Rouverol . |
| 3,323,624 | 6/1967 | Maurice . |
| 3,360,998 | 1/1968 | Griffel . |
| 3,362,256 | 1/1968 | Cluff et al. . |
| 3,375,911 | 4/1968 | Smirl . |
| 3,406,583 | 10/1968 | Baier . |
| 3,428,155 | 2/1969 | Binder et al. . |
| 3,557,573 | 1/1971 | Hansgen . |
| 3,557,633 | 1/1971 | Frerichs . |
| 3,565,223 | 2/1971 | Pierce . |
| 3,628,353 | 12/1971 | Armstrong . |
| 3,640,363 | 2/1972 | Spalding . |
| 3,667,317 | 6/1972 | Hillingrathner . |
| 3,757,608 | 9/1973 | Willner . |
| 3,770,088 | 11/1973 | Shono . |
| 3,791,499 | 2/1974 | Ryan . |
| 3,885,657 | 5/1975 | Sato . |
| 3,930,339 | 1/1976 | Jander . |
| 3,943,788 | 3/1976 | Kummel et al. . |
| 3,952,546 | 4/1976 | Nakano et al. . |
| 4,004,669 | 1/1977 | Roderick . |
| 4,178,811 | 12/1979 | Shepherd . |
| 4,184,578 | 1/1980 | Moore et al. . |
| 4,222,202 | 9/1980 | Pigeon . |
| 4,241,818 | 12/1980 | Miller . |
| 4,296,851 | 10/1981 | Pierce . |
| 4,296,853 | 10/1981 | Kronet . |
| 4,296,854 | 10/1981 | Staub, Jr. . |
| 4,300,670 | 11/1981 | Mathues . |
| 4,328,879 | 5/1982 | Tone . |
| 4,441,600 | 4/1984 | Caray . |
| 4,461,376 | 7/1984 | Lech, Jr. et al. . |
| 4,465,172 | 8/1984 | Gatewood . |
| 4,474,276 | 10/1984 | Loizeau . |
| 4,478,326 | 10/1984 | Rotter . |
| 4,511,186 | 4/1985 | Sasamoto . |
| 4,530,673 | 7/1985 | Lamarche . |
| 4,537,298 | 8/1985 | Loizeau . |
| 4,541,296 | 9/1985 | Oyafuso . |
| 4,549,642 | 10/1985 | Loizeau . |
| 4,552,543 | 11/1985 | Wolf et al. . |
| 4,553,656 | 11/1985 | Lense ................................. 192/150 X |
| 4,558,773 | 12/1985 | Schafer . |
| 4,560,366 | 12/1985 | Loizeau . |
| 4,560,367 | 12/1985 | Wolf et al. . |
| 4,562,913 | 1/1986 | Cucinotta et al. . |
| 4,564,097 | 1/1986 | Kabayama . |
| 4,572,344 | 2/1986 | Horiuchi et al. . |
| 4,574,930 | 3/1986 | Koitabashi . |
| 4,591,040 | 5/1986 | Schraut et al. . |
| 4,606,451 | 8/1986 | Martinez-Corral et al. . |
| 4,609,088 | 9/1986 | Takeuchi . |
| 4,615,096 | 10/1986 | Foster . |
| 4,616,742 | 10/1986 | Matsushita . |
| 4,624,351 | 11/1986 | Lutz et al. . |
| 4,629,048 | 12/1986 | Draper et al. . |
| 4,632,235 | 12/1986 | Flotow et al. . |
| 4,635,779 | 1/1987 | Bacher et al. . |
| 4,635,780 | 1/1987 | Wiggen . |
| 4,638,684 | 1/1987 | Maucher . |
| 4,646,899 | 3/1987 | Murakami . |
| 4,660,698 | 4/1987 | Miura ......................................... 74/446 |
| 4,674,351 | 6/1987 | Byrd . |
| 4,680,979 | 7/1987 | Morishita et al. . |
| 4,693,354 | 9/1987 | Umeyama et al. . |
| 4,696,384 | 9/1987 | Huber . |
| 4,709,796 | 12/1987 | Uenohara . |
| 4,729,464 | 3/1988 | Friedmann . |
| 4,732,250 | 3/1988 | Maucher et al. . |
| 4,741,420 | 5/1988 | Fujito et al. . |
| 4,744,448 | 5/1988 | Maycock et al. . |
| 4,760,906 | 8/1988 | Flotow et al. . |
| 4,764,152 | 8/1988 | Jorg et al. . |
| 4,793,455 | 12/1988 | Tabuchi et al. . |
| 4,796,728 | 1/1989 | Kanengieter et al. . |
| 4,846,323 | 7/1989 | Fukushima . |
| 4,891,033 | 1/1990 | Heyser . |
| 4,892,008 | 1/1990 | Naudin et al. . |
| 4,899,862 | 2/1990 | Graton et al. . |
| 4,913,275 | 4/1990 | Kobayashi et al. . |
| 4,919,246 | 4/1990 | Gay et al. . |
| 4,938,729 | 7/1990 | Hamada et al. . |
| 4,951,515 | 8/1990 | Morishita et al. . |
| 4,972,734 | 11/1990 | Hyodo et al. . |
| 4,987,987 | 1/1991 | Damon et al. . |
| 4,996,892 | 3/1991 | Yamamoto . |
| 5,032,107 | 7/1991 | Umeyama et al. . |
| 5,052,244 | 10/1991 | Kamiya et al. . |
| 5,062,517 | 11/1991 | Muchmore et al. . |
| 5,064,041 | 11/1991 | Graton et al. . |
| 5,064,042 | 11/1991 | Kuhne et al. . |
| 5,067,602 | 11/1991 | Flotow et al. . |
| 5,088,964 | 2/1992 | Kuhne . |
| 5,090,543 | 2/1992 | Takeuchi . |
| 5,127,279 | 7/1992 | Barthruff . |
| 5,135,089 | 8/1992 | Kovac . |
| 5,138,902 | 8/1992 | Muller et al. . |
| 5,139,122 | 8/1992 | Maeda et al. . |
| 5,146,811 | 9/1992 | Jackel . |
| 5,147,246 | 9/1992 | Focqueur et al. . |

| | | |
|---|---|---|
| 5,158,508 | 10/1992 | Sakaguchi et al. . |
| 5,161,660 | 11/1992 | Huber . |
| 5,169,357 | 12/1992 | Graton . |
| 5,186,077 | 2/1993 | Nakane . |
| 5,195,625 | 3/1993 | Chang et al. . |
| 5,201,394 | 4/1993 | Suzuki . |
| 5,203,835 | 4/1993 | Kohno et al. . |
| 5,205,389 | 4/1993 | Raab et al. . |
| 5,209,139 | 5/1993 | Janiszewski . |
| 5,209,330 | 5/1993 | Macdonald . |
| 5,209,334 | 5/1993 | Fischer et al. . |
| 5,213,188 | 5/1993 | Feser et al. . |
| 5,217,409 | 6/1993 | Dalbiez . |
| 5,218,884 | 6/1993 | Rohrle . |
| 5,226,259 | 7/1993 | Yamagata et al. . |
| 5,230,409 | 7/1993 | Tanaka et al. . |
| 5,230,415 | 7/1993 | Ament et al. . |
| 5,240,458 | 8/1993 | Linglain et al. . |
| 5,245,889 | 9/1993 | Kohno et al. . |
| 5,246,398 | 9/1993 | Birk et al. . |
| 5,246,399 | 9/1993 | Yanko et al. . |
| 5,255,470 | 10/1993 | Dupuy . |
| 5,255,761 | 10/1993 | Zaremsky . |
| 5,257,687 | 11/1993 | Cooke . |
| 5,261,517 | 11/1993 | Hering . |
| 5,269,725 | 12/1993 | Maucher et al. . |
| 5,273,145 | 12/1993 | Corral et al. . |
| 5,279,398 | 1/1994 | Graton et al. . |
| 5,289,737 | 3/1994 | Kuhne . |
| 5,293,978 | 3/1994 | Reik et al. . |
| 5,307,704 | 5/1994 | Muller et al. .................... 74/425 X |
| 5,307,705 | 5/1994 | Fenelon . |
| 5,308,282 | 5/1994 | Hansen et al. . |
| 5,310,025 | 5/1994 | Anderson . |
| 5,314,051 | 5/1994 | Marie et al. . |
| 5,318,478 | 6/1994 | Khune et al. . |
| 5,322,149 | 6/1994 | Szadkowski . |
| 5,322,474 | 6/1994 | Hashimoto et al. . |
| 5,333,713 | 8/1994 | Hagnere et al. . |
| 5,349,883 | 9/1994 | Reik et al. . |
| 5,351,443 | 10/1994 | Kimura et al. . |
| 5,352,156 | 10/1994 | Klein et al. . |
| 5,360,090 | 11/1994 | Stretch et al. . |
| 5,440,186 | 8/1995 | Forsell et al. . |

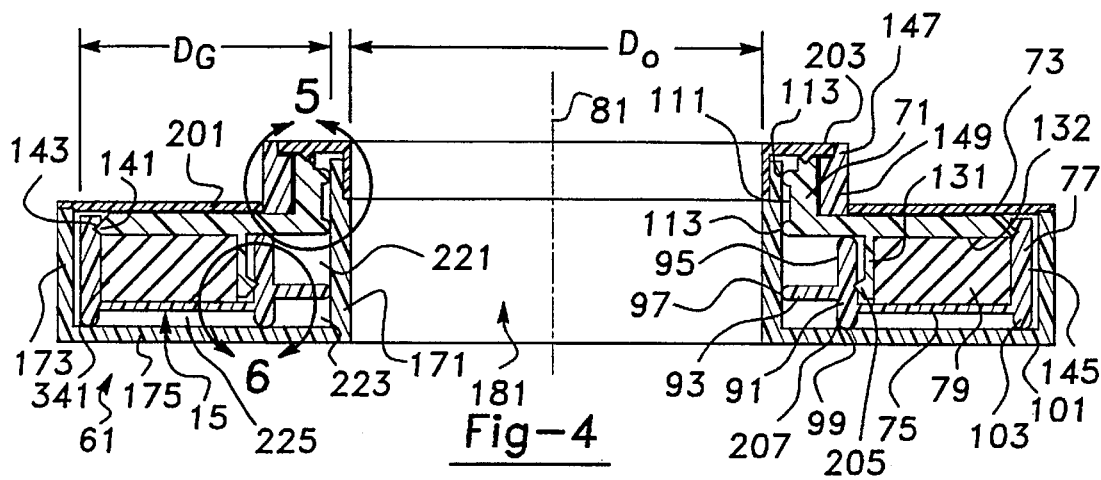
Fig-4
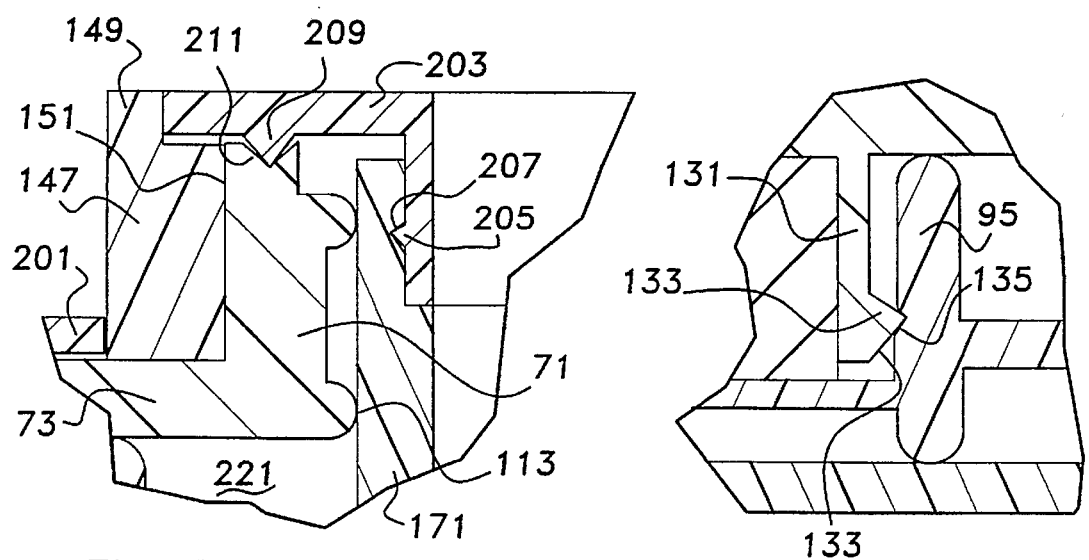
Fig-5
Fig-6
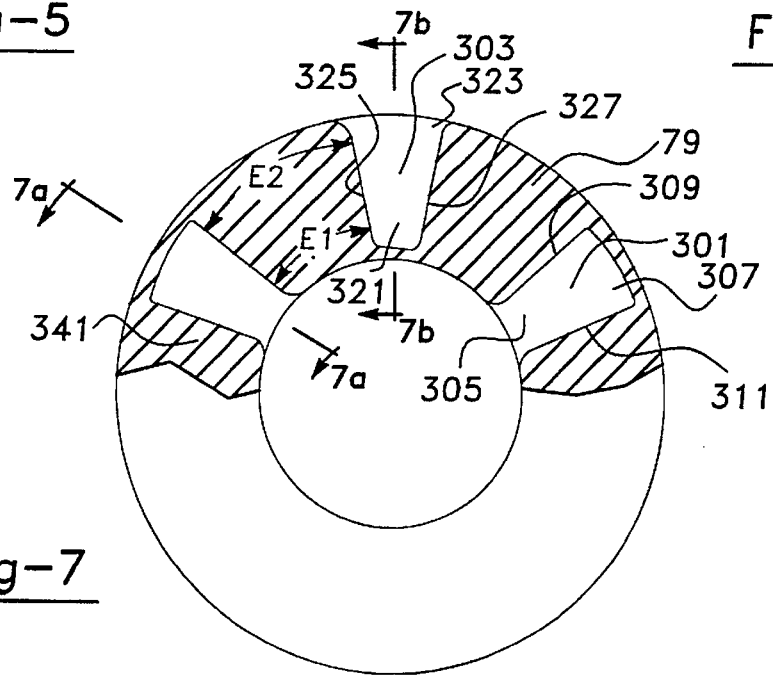
Fig-7

STRESS DISSIPATION APPARATUS

CROSS REFERENCE TO RELATED APPLICATIONS

This application is a continuation-in-part of U.S. application Ser. No. 08/488,344 filed Jun. 7, 1995 which is a continuation-in-part of PCT application Ser. No. PCT/US94/01577 filed Feb. 9, 1994 which designated the United States as a continuation-in-part of U.S. application Ser. No. 160,544, filed Dec. 1, 1993, now issued on Sep. 26, 1995 as U.S. Pat. No. 5,452,622, which is a continuation-in-part of U.S. application Ser. No. 08/015,332, filed Feb. 9, 1993, now issued on May 3, 1994 as U.S. Pat. No, 5,307,705; this application is also directly a continuation-in-part of U.S. application Ser. No. 160,544, filed Dec. 1, 1993, now issued on Sep. 26, 1995 as U.S. Pat. No. 5,452,622, which is a continuation-in-part of U.S. application Ser. No. 08/015, 332, filed Feb. 9, 1993, now issued on May 3, 1994 as U.S. Pat. No. , 5,307,705; all of these are incorporated by reference herewithin.

BACKGROUND OF THE INVENTION

This invention relates generally to rotatable apparatuses and specifically to a rotatable apparatus having a pair of rotatable members joined by a stress dissipating structure and a rotatable apparatus having enlarged and decreased rpm driven and pinion gear portions for use with a worm drive and a smaller motor.

The primary function of a gear is to transmit power from a power generating source to an operating device. This is achieved through the intermeshing and continuity of action between the teeth of a driving gear which is associated with the power source and the teeth of the mating gear which is associated with the operating device. Since a gear is a rotating body, a state of dynamic equilibrium must be attained. Therefore, to be in dynamic equilibrium all of the reactions from the rotating gear must be neutralized by equal and opposite forces supporting the gear shaft.

Traditional gear design comprises a central hub, a web extending radially outward therefrom which is, in turn, peripherally bordered by an integral radial rim having geared teeth thereupon. Gear failure can occur if manufacturing tolerances, material type, and gear design are not matched to the service application. Furthermore, since gears have historically been manufactured from a single homogeneous material, the bulk rigidity and strength of the web is generally greater than or equal to that of the hub and rim. Thus, torsional stresses created through start-up, shut-down, overload, or through cyclical fatigue are localized in the teeth and hub areas. As a result, gears typically fail at the root of the teeth or in the hub region. Such failures include excessive wear, plastic flow or creep, tooth bending fatigue, contact fatigue (pitting and spalling), thermal fatigue, tooth bending impact, tooth shear, tooth chipping, case crushing, torsional shear and stress ruptures. Many of these failures are due primarily to overload, cycling fatigue, and/or start-up and shut-down rotational shock referenced above that is especially prevalent in gears that perform in non-constant rotation service applications.

Additionally, most, if not all, motors and gears used in automotive window lift applications tend to be rather large in a transverse direction (i.e., perpendicular to the armature shaft rotational axis) primarily due to the inefficiently constructed conventional driven gear coupled thereto. This largeness in size adds to packaging problems within the doors thereby reducing occupant shoulder room. These motors also add unnecessary weight which adversely affects the vehicle's gas/mileage performance.

An alternative gear design that has been used is a compliant gear having a rigid one-piece hub and web, and a separate rim member with a rubber-like insert or ring located between the outer radial edge of the web and the inner radial edge of the rim. An example of this configuration is disclosed in U.S. Pat. No. 2,307,129 entitled "Shock Proof Gear", issued to Hines et al. on Jan. 5, 1943, which is incorporated by reference herewithin. Although the rubber-like insert of Hines is supposed to dampen audible vibrations and somewhat reduce resultant stresses within the gear, under load the rim is capable of compressing one side of the rubber-like insert such that the rotational axis of the rim could become axially offset from the rotational axis of the hub. This misalignment can cause partial or complete disengagement of the gear teeth of the compliant gear from those of its mating gear. In addition, gears having this type of rubber-like insert strictly between the web and the rim are subject to the rim torquing away from the hub in a transverse direction normal to the direction of rotation. Under load this transverse movement may also cause misalignment of the mating gear teeth which will localize stresses upon distinct portions of each tooth. Moreover, the hub and rim may not provide an adequate attachment, and thus force transfer, surface for the rubber-like insert in extreme torque situations. A similar design using elastomeric laminates with a shim therebetween is disclosed in U.S. Pat. No. 4,674,351 entitled "Compliant Gear", issued to Byrd on Jun. 23, 1987.

Another compliant rotating member configuration is disclosed in FIG. 8 of U.S. Pat. No. 3,216,267 entitled "Rotary Motion Transmitting Mechanism For Internal Combustion Engines And The Like", issued to Dolza on Nov. 9, 1965. The Dolza sprocket/gear design contains a stamped cup-shaped hub which has an outward radially extending flange and a cushioning member fully attached to the side thereof. The rim of the sprocket/gear has a generally L-shaped cross section with the radial inward leg being fully attached to the opposite side of the cushioning member. In that design there are gaps between the outer circumference of the cushioning member and the inside radial surface of the rim and also a gap between the radially inward surface of the cushioning member and the radially outward horizontal edge of the cup-shaped hub section. While the sprocket/gear is designed to maintain angular torsional rigidity while having radial flexibility, under load the rim of the sprocket/gear may become elliptical and thus encroach upon the gaps created above and below the cushioning member. Moreover, the rotational axis of the rim may also become offset from the rotational axis of the hub under working conditions.

It is also known to provide a sunroof motor with a conventional gear having a unitary polymeric rim, offset web and hub. This gear further has a receptacle and an inner set of rim channels for receiving a metallic cup in an interlocking fashion. A Belleville washer frictionally rides against an outer surface of the metal cup and is interlocked to a pinion shaft. The gear is also journalled freely about the shaft. The amount of frictional force exerted by the Belleville washer against the cup is controlled by the amount of torque supplied to a pinion shaft engaging nut; thus, the Belleville washer acts as a clutch mechanism. However, this traditional sunroof motor is not provided with a rotational stress dissipating structure beyond the coaxial Belleville washer. This sunroof motor and gear system also suffers from being large in transverse size and heavy in weight.

Furthermore, many conventional clutches employ rotation dampening devices and spring biasing devices. For instance, reference should be made to the following U.S. Pat. No. : 5,333,713 entitled "Friction Clutch" which issued to Hagnere et al. on Aug. 2, 1994; U.S. Pat. No. 5,322,141 entitled "Damped Driven Disk Assembly" which issued to Szadkowski on Jun. 21, 1994; U.S. Pat. No. 5,310,025 entitled "Aircraft Brake Vibration Damper" which issued to Anderson on May 10, 1994; U.S. Pat. No. 5,308,282 entitled "Pressure Plate for a Vibration Damper Assembly having Built-In Lash" which issued to Hansen et al. on May 3, 1994; U.S. Pat. No. 5,273,145 entitled "Hydraulic Clutch Control Means, In Particular For A Motor Vehicle" which issued to Corral et al. on Dec. 28, 1993; U.S. Pat. No. 5,186,077 entitled "Torque Variation Absorbing Device" which issued to Nakane on Feb. 16, 1993; U.S. Pat. No. 5,161,660 entitled "Clutch Plate with Plural Dampers" which issued to Huber on Nov. 10, 1992; RE Pat. No. 34,105 entitled "Internal Assisted Clutch" which issued to Flotow et al. on Oct. 20, 1992; and U.S. Pat. No. 4,996,892 entitled "Flywheel Assembly" which issued to Yamamoto on Mar. 5, 1991; all of which are incorporated by reference herewithin. While many of these clutch constructions recognize an unsatisfied need for rotational stress reduction devices therein, and propose various supposed improvements therein, further improvement in performance, cost and assembly would be desirable. For example, the rotationally oriented compression springs utilized in some of these constructions can be easily overcompressed beyond their elasticity limit, thus, leading to poor subsequent performance. By themselves, these compression springs are not well suited for repeated, high load, full compression.

SUMMARY OF THE INVENTION

In accordance with the present invention, the preferred embodiment of a rotatable apparatus includes a pair of rotatable members joined by a stress dissipating structure. The stress dissipating structure can be employed in a gear, sprocket, clutch or the like. In one embodiment of the present invention, antibuckling plates generally spanning between a hub and rim define a hollow cavity. In another embodiment of the present invention, the stress dissipating structure includes specifically configured sets of nodules moving with the hub and rim. An additional aspect of the present invention provides a stress dissipating structure employing various anti-buckling plate attachment constructions. In still another embodiment of the present invention, a uniquely sized and packaged gear, gear housing and/or motor are employed in order to maximize output force per pound of material efficiencies. An additional advantage of the present invention over conventional systems is that the present invention allows for a worm drive system coupled to a pinion gear to be vastly improved regarding weight and size and, hence, power density (i.e., pounds torque achieved per pound of material utilized). This is realized by recognizing that torque is directly proportional to force times distance and to horsepower divided by speed. Thus, by using a reduced size motor with worm gear attached to power a ring or driven gear with an integrally attached pinion, power density efficiencies greater than 50% over conventional systems are achievable.

The configurations of the apparatus of the present invention are advantageous over conventional systems in that the present invention allows the stress dissipating structure to absorb structural stresses between the hub and the rim due to instantaneous shocks created by apparatus rotational start-up or shut-down, cyclical fatigue, and/or overload. Furthermore, the stress dissipating resilient structure, especially when coupled with anti-buckling plates, provides significant lateral planar rigidity thereby resisting angular torsional deformation in a direction normal to the rotational axis between the rim and the hub while also discouraging rotational axis misalignment between the rim and the hub (i.e., the center to center distances between driven and drive gears are always maintained). By matching the bulk torsional rigidity and allowed torsional deformations of the stress dissipating structure, which can be a function of its modulus of elasticity, its dimensional thickness, or the specific formations chosen, to that of the output coupling performance proportions, the beneficial characteristics of a conventional single piece homogenous gear, sprocket and clutch are maintained while the resilient structure acts to synergistically dissipate stresses between the rim and the hub.

The apparatus of the present invention is also much thinner in a transverse (or crosscar) direction than conventional apparatuses thereby providing packaging benefits. Furthermore, the present invention is significantly lighter in weight than conventional systems while still increasing the output force per pound of material efficiencies. Additional objects, advantages, and features of the present invention will become apparent from the following description and appended claims, taken in conjunction with the accompanying drawings.

BRIEF DESCRIPTION OF THE DRAWINGS

FIG. 4 is a cross sectional view, taken along line 4—4 of FIG. 3, showing the preferred embodiment of the present invention stress dissipation apparatus;

FIG. 5 is an enlarged sectional view, taken within circle 5—5 of FIG. 4, showing snap-fit attachments employed with the preferred embodiment of the present invention stress dissipation apparatus;

FIG. 6 is an enlarged sectional view, taken within circle 6—6 of FIG. 4, showing another snap-fit attachment employed with the preferred embodiment of the present invention stress dissipation apparatus;

FIG. 7 is a diagrammatic side elevational view showing the relationship of nodules within the preferred embodiment stress dissipation apparatus of the present invention.

DETAILED DESCRIPTION OF THE PREFERRED EMBODIMENT

Figure 1:
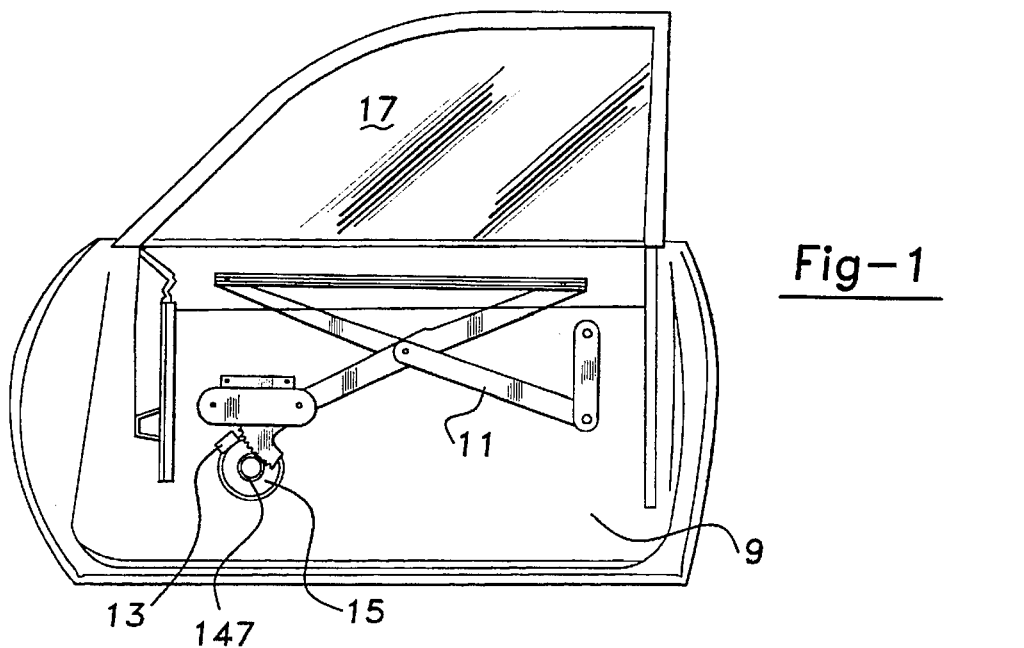
FIG. 1 is a diagrammatic side elevational view showing the preferred embodiment of a stress dissipation apparatus of the present invention employed in an automotive vehicle window lift mechanism.

The preferred embodiment of a stress dissipation apparatus of the present invention can be employed in combination with an automotive vehicle door 9 window lift regulator or mechanism 11 as is shown in FIG. 1. In this window lift application, the stress dissipation apparatus includes a fractional horsepower dc electric motor 13 which drives a driven gear 15 coupled to a scissor arm linkage. The scissor arm linkage raises and lowers a window 17 coupled thereto. The stress dissipation apparatus of the present invention can also be employed with other types of automotive window lift mechanisms such as, for example, that disclosed within the following U.S. Pat. No. : 5,351,443 entitled "Automotive Door with Window Pane lifter Module" which issued to Kimura et al. on Oct. 4, 1994; U.S. Pat. No. 5,255,470 entitled "Vehicle Door Glass Regulator" which issued to Dupuy on Oct. 26, 1993; U.S. Pat. No. 5,226,259 entitled "Automotive Door with Power Window" which issued to Yamagata et al. on Jul. 13, 1993; U.S. Pat. No. 4,222,202 entitled "Automotive Tape Drive Window Regulator" which issued to Pigeon on Sep. 16, 1980; and U.S. Pat. No. 3,930,339 entitled "Window Regulator, Especially for Automobiles, with a Threaded Cable Moving in a Guide" which issued to Jander on Jan. 6, 1976; all of which are incorporated by reference herewithin.

Figure 2:
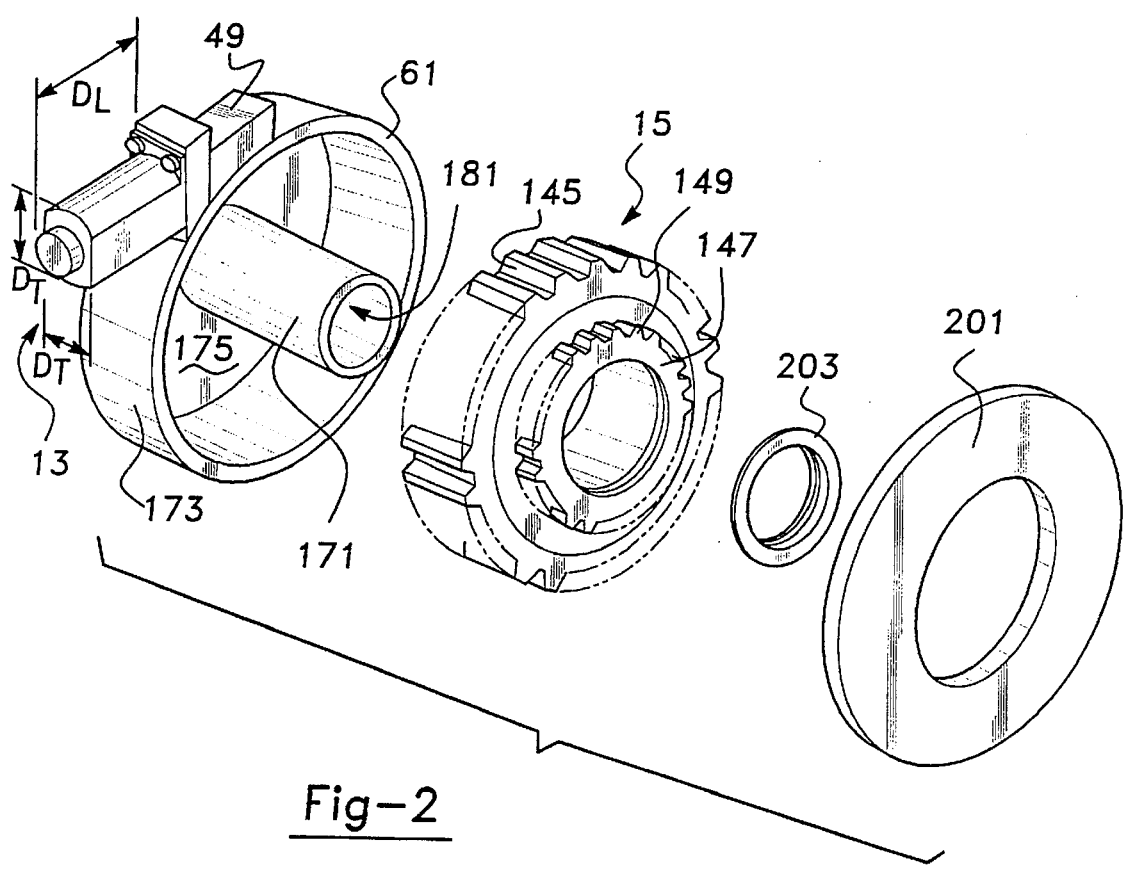
FIG. 2 is a partially exploded perspective view showing the preferred embodiment of the present invention stress dissipation apparatus.
Figure 3:
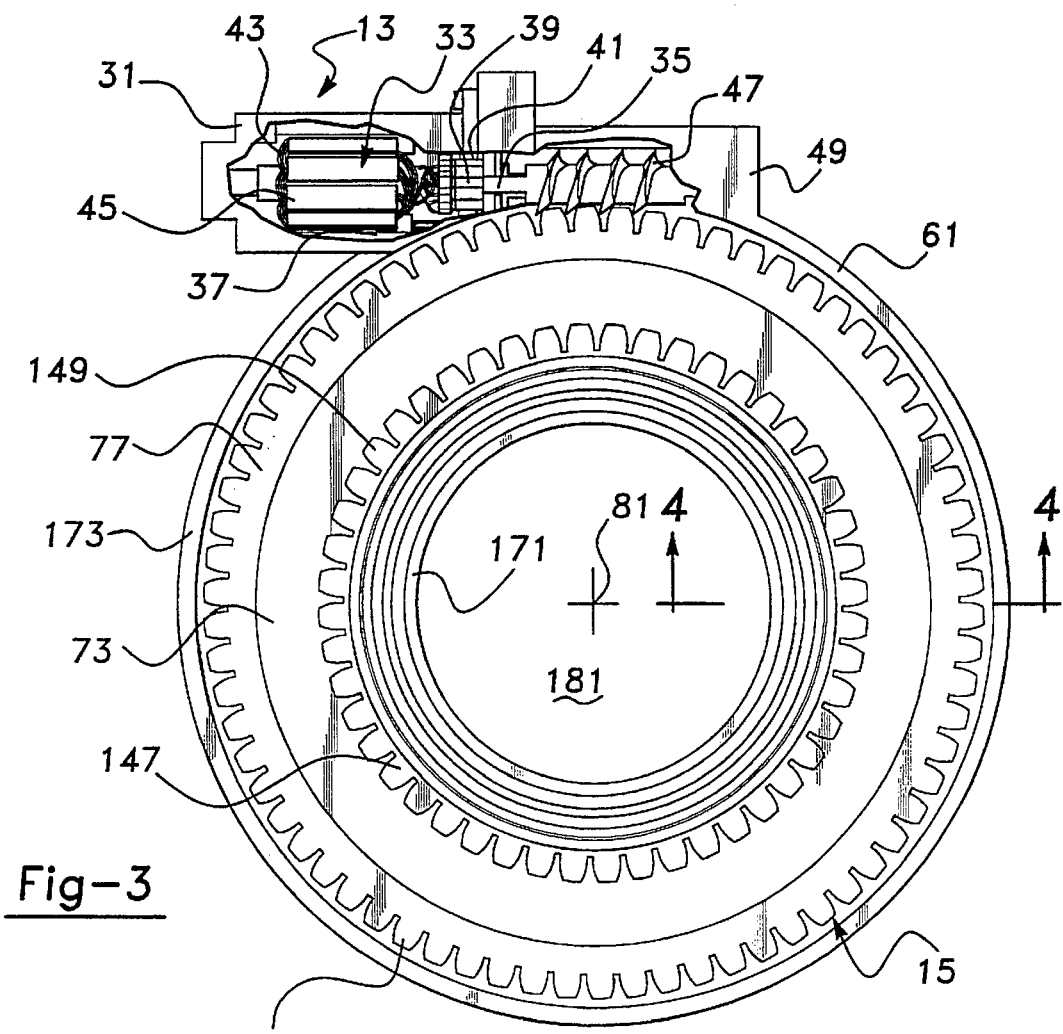
FIG. 3 is a side elevational view showing the preferred embodiment of the present invention stress dissipation apparatus, with portions broken away therefrom.

Now referring to FIGS. 2 and 3, electric motor 13 includes an armature or motor housing 31, an armature 33, an armature shaft 35, permanent fixed magnets 37, a commutator 39 and a brush card assembly 41. Armature 33 includes copper wire windings 43 wrapped inside of a plurality of armature pack slots which are juxtaposed between a plurality of magnetically conductive armature teeth 45. A helically wound worm gear portion 47 is located upon armature shaft 35. Worm gear portion 47 is juxtaposed within a worm housing portion 49 of a driven gear housing 61. Armature housing 31 has a longitudinal dimension "$D_L$" and transverse dimensions "$D_T$." When electric motor 13 is installed in door 9 (see FIG. 1), the crosscar transverse dimension of motor 13, the lateral direction of driven gear housing 61 and the lateral direction of driven gear 15, are all taken in a direction that is perpendicular to the plane of the side views shown in FIGS. 1 and 3.

While electric motor 13 may have a variety of configurations and components, the electric motor illustrated as part of the present invention stress dissipation apparatus has similar characteristics to that disclosed in U.S. Pat. No. 5,440,186 entitled "Motor with Isolated Brush Card Assembly" which issued to Forsell et al. on Aug. 8, 1995, and is also incorporated by reference herewithin. However, as will be further discussed hereinafter, the electric motors of the present invention and of U.S. Pat. No. 5,440,186 have significantly differing sizes and weights due to the driven stress dissipating gear 15 and driven gear housing constructions of the present invention.

Referring to FIGS. 3 and 4, driven stress dissipation gear 15 includes a hub 71, a first annular antibuckling plate 73, a second annular antibuckling plate 75, a rim 77 and a rotational stress dissipation device 79. All of these driven gear elements rotatably surround a driven gear rotational axis 81. First antibuckling plate 73 is integrally molded as part of a laterally offset wall of hub 71 while second antibuckling plate 75 is integrally molded as part of a section of rim 77. An auxiliary hub 91 is integrally formed from an end of second antibuckling plate 75 opposite that of an edge adjoining rim 77. Lateral edges of auxiliary hub 91 are provided with rounded corners to minimize surface area contact against the adjacent first antibuckling plate 73 and driven gear housing 61. A radially projecting annular foot 93 inwardly depends from a median portion of an auxiliary hub internal surface 95. A curved edge 97 of foot 93, curved edge 99 of auxiliary hub 91, and a curved end 101 of a finger 103 laterally project from rim 77 and act as bearing surfaces against driven gear housing 61. An inner surface 111 of hub 71 also has a pair of curved fingers 113 which act as bearing surfaces against driven gear housing 61.

A generally cylindrical leg 131 inwardly extends, in a lateral direction, from an inside face 132, of first antibuckling plate 73. A pointed barb 135, outwardly extending from a distal end of leg 131, engages a V-shaped receptacle 135 disposed in auxiliary hub 91. Barb 133 and receptacle 135 achieve a snap-fit attachment between antibuckling plates 73 and 75. This can best be observed by reference to FIG. 6.

Returning to FIG. 4, an outer edge 141 of first antibuckling plate 73 is placed in snap-fit engagement within a V-shaped receptacle 143 of rim 77. Thus, first antibuckling plate 73 is prevented from laterally moving relative to rim 77 while first antibuckling plate 73 can be rotated somewhat independently of rim 77.

As can be observed in FIGS. 2 and 3, rim 77 has a set of geared teeth 145 outwardly projecting therefrom for engagement with worm gear portion 47 of motor 13. Additionally, as is shown in FIGS. 2 through 5, a steel pinion gear 147, having outwardly extending spur gear teeth 149, is pressfit or otherwise affixed upon an outer surface 151 of hub 71. A knurled pattern may be provided upon an interior surface of pinion gear 147 to ensure proper frictional engagement with hub 71. Pinion gear 147 may also be attached to hub 71 through sonic welding, remelting of the hub through pinion gear heating or the like. Hub 71, first antibuckling plate 73, second antibuckling plate 75 and rim 77 are all preferably injection molded from an engineering grade thermoplastic material such as polyacetyl, a modified PBT, or a modified polyamide.

FIGS. 2, 4 and 5 illustrate driven gear housing 61 as being an injection molded engineering grade material (or alternately, suitable die cast metals such as zinc, aluminum or magnesium) with a cup-shaped cross section defined by a generally cylindrical interior wall 171, a generally cylindrical exterior wall 173 and a generally annular bottom wall 175. An inner surface of interior wall 171 defines a substantially cylindrical opening 181. As can be observed in FIG. 4, cylindrical opening 181 has a diameter "$D_O$" relatively larger than a radial distance "$D_G$" of one side of the gear (i.e., the difference between the radii of the rim and the hub). Therefore, even though the present invention gear has a much larger outer diameter as compared to conventional gears, the enlarged cylindrical opening 181, coupled with a slightly thinner lateral dimension in combination with a proportionally reduced motor size, result in overall weight reduction as compared to conventional gears and drives.

Returning again to FIGS. 2, 4 and 5, an injection molded polymeric cover plate 201, having an annular configuration, is screwed onto flanges (not shown) with bosses extending from exterior wall 173 of driven gear housing 61. A flexible moisture seal, such as a nylon or teflon O-ring may be employed between an inner edge of cover plate 201 and the adjacent antibuckling plate 73. An injection molded polymeric retaining plate 203 is attached to interior wall 171 of driven gear housing 61 through a pointed snap-fit barb 205 disposed along a side leg mating with a V-shaped receptacle 207. Along an adjoining perpendicular top leg of retaining plate 203, there is a laterally oriented and pointed snap-fit barb 209 which slidably engages into a V-shaped receptacle 211 of a distal edge of hub 71. A sealing O-ring or the like may be provided between retaining plate and driven gear housing 61 or between retaining plate 203 and hub 71.

Within the gear, a hollow and substantially annular cavity 221 is bordered by first antibuckling plate 73, auxiliary hub 91 of second antibuckling plate 75, foot 93 of second antibuckling plate 75 and interior wall 171 of driven gear housing 61. Other hollow and annular cavities 223 and 225 are also provided between portions of second antibuckling plate 75 and driven gear housing 61. All of these cavities further contribute to the weight reduction achieved by the present invention system while also allowing for their bordering plate segments to act as a strong box-like structure.

Figure 7A:
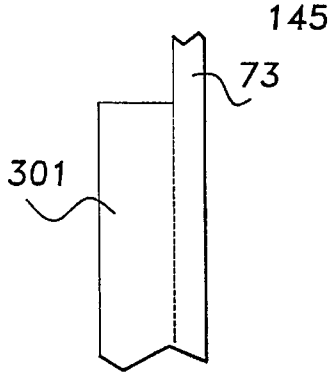
FIGS. 7a and 7b are fragmentary cross-sectional views, taken along lines 7a—7a and 7b—7b, respectively, showing the relationship of the nodules to the anti-buckling plates.
Figure 7B:
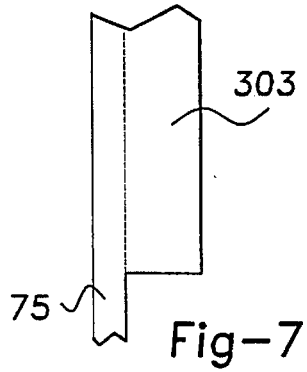

Rotational stress dissipation device 79 is best illustrated in FIGS. 4 and 7. A first set of nodules 301 radially extends outward from an inner member defined as either a modified form of the hub or the first antibuckling plate. A second set of nodules 303 radially extends inward from an outer member defined as the rim or the second antibuckling plate. Each first nodule 301 has a proximal end 305 with a relatively constricted rotational direction dimension as compared to an expanded rotational direction dimension disposed at a distal end 307. Tapered surfaces 309 and 311 extend between the proximal and distal ends.

Second nodules 303 have a distal end 321 with a relatively constricted rotational direction dimension as compared to an expanded rotational direction dimension disposed at a proximal end 323. Tapered surfaces 325 and 327 extend between the proximal and distal ends. An elastomeric material 341 such as Santoprene® 55 acts as a resilient member disposed between the first and second sets of nodules 301 and 303, respectively, for reducing differential rotational movements between the hub and rim. Elastomeric material 341 can be injection molded or, alternately, reaction injection molded in-place with the hub 71 and rim 77 preassembled or elastomeric material 341 can be separately molded and then manually inserted between the hub 71 and rim 77. While the resilient member is preferably shown as being elastomeric material, it may alternately comprise springs, flexible spokes or the like. The design structure employed with the present invention allows for utilization of increased diameter driven and pinion gears in combination with smaller electric motors. This results in overall reduced weight and provides for improved dynamics with worm gear, driven gear and pinion gear speeds being drastically reduced. These reduced gear speeds provide for, in addition to other things, reduced wear, quietness and shock loads.

The amount of taper of each of the nodules 301 and 303 and the amount of elastomeric material ("E") disposed between each pair of adjacent nodules 301 and 303 can be generally characterized by the following formula:

$$\frac{E_2}{E_1} = \frac{D_2}{D_1}$$

where $E_2$ is a rotational direction dimension between the proximal end of one of the second set of nodules and the distal end of an adjacent one of the first set of nodules;

$E_1$ is a rotational direction dimension between the distal end of the one of the second set of nodules and the proximal end of the adjacent one of the first set of nodules;

$D_2$ is a diameter of the rim teeth 145; and $D_1$ is a diameter of the hub teeth 149;

whereby generally uniform strain is imparted upon the elastomeric material 79 during deformation due to differing rotational movement between the rim 77 and the hub 71.

An alternate embodiment enlarged diameter driven gear can also be employed in combination with the reduced size motor. In this embodiment a single web spans between an integrally formed hub and web. Thus, the hub, web and rim all rotate the same amount as a solid gear. Due to the enlarged driven and pinion gear diameters, a stress dissipating structure may not be required since the gears will rotate at significantly slower speeds and thus be less susceptible to shocks and stress. Since the cylindrical opening within the driven gear housing is of a large size, overall part weight is minimized. The driven and pinion gears can be die cast from a metallic material or can be injection molded from a reinforced nylon or reinforced polyester polymeric material.

The following Table 1 sets forth the theoretical values and sizes of a selected present invention system as compared to an existing conventional automotive window lift system. It is significant to note that the total system weight reduction is 300 grams (approximately 30% less than conventional systems) while the overall system output torque is maintained. Thus, very significant efficiencies in power density are achieved (i.e., 61 inch-pounds per pound for traditional systems versus 91 inch-pounds per pound for one version of the present invention; this amounts to greater than 50% improvement) while the lateral size and system weight are reduced. Furthermore, due to the smaller motor size (e.g., requiring less copper wire windings, smaller permanent magnets and the like) very significant cost savings are also achieved.

TABLE 1

| | CONVENTIONAL SYSTEM | PRESENT INVENTION SYSTEM |
|---|---|---|
| Electric Motor and Armature Housing | Weight = 525 grams* Armature housing length = 2¾ inches ($D_L$) × 2 inches ($D_T$) Worm RPM = 6000–8000 Motor horsepower = 0.25 | Weight = 200 grams* Armature housing size = 1½ inches ($D_L$) × 1½ inches ($D_T$) Worm RPM = 2400 Motor horsepower = 0.041 |
| Worm Gear Portion and Worm Housing and Driven Gear Housing | Driven gear housing diameter = 2.5 inches Weight = 275 grams | Driven gear diameter = 4.8 inches Weight = 325 grams |
| Driven Gear | Diameter = 2.4 inches Weight = 95 grams | Diameter = 4.9 inches Weight = 45 grams |
| Pinion Gear | Diameter = 9/16 inch Weight = 30 grams | Diameter = 4 inches Weight = 55 grams |
| System Torque | 125 inch-pounds | 125 inch-pounds |
| Total Weight | 925 grams | 625 grams |

The following formulas, Table 2, and discussion thereafter, are designed to allow one skilled in the art to utilize the present invention in systems having various sized driven gears, pinion gears and output torques:

Horsepower=[(Torque)(RPM)]/Constant

Horsepower=[(Torque)(RPM)]/63025, where torque is measured in inches-pounds.

Torque=(Distance)(Force).

TABLE 2

| EXEMPLARY GEAR NO. | 1 | 2 | 3 | 4 | 5 | 6 |
| --- | --- | --- | --- | --- | --- | --- |
| WEIGHT (GRAMS) | 925 | 775 | 725 | 750 | 625 | 575 |
| WINDOW SPEED* (FEET/MINUTE) | 20 | 20 | 20 | 20 | 20 | 20 |
| PINION GEAR** RPM | 125 | 625 | 62.5 | 27.7 | 20.8 | 13.3 |
| PINION GEAR** NO. OF TEETH | 9 | 18 | 18 | 32 | 54 | 72 |
| DRIVEN GEAR - RPM | 125 | 62.5 | 62.5 | 27.7 | 20.8 | 13.3 |
| DRIVEN GEAR DIAMETER (INCHES) | 2.4 | 2.4 | 2.4 | 3.6 | 4.8 | 6.0 |
| DRIVEN GEAR DIAMETER % INCREASE | — | 0 | 0 | 50 | 100 | 150 |
| WORM GEAR - RPM | 7200 | 3650 | 3600 | 2400 | 2400 | 1920 |
| MOTOR HORSEPOWER | 0.248 | 0.124 | 0.124 | 0.055 | 0.041 | 0.026 |
| PINION GEAR TORQUE (INCHES-POUNDS) | 125 | 125 | 125 | 125 | 125 | 125 |

Figure 8A:
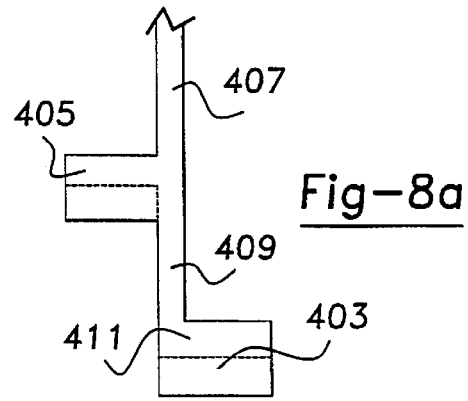
FIG. 8a is a cross-sectional view, taken along line 8a—8a taken from FIG. 8.
Figure 8:
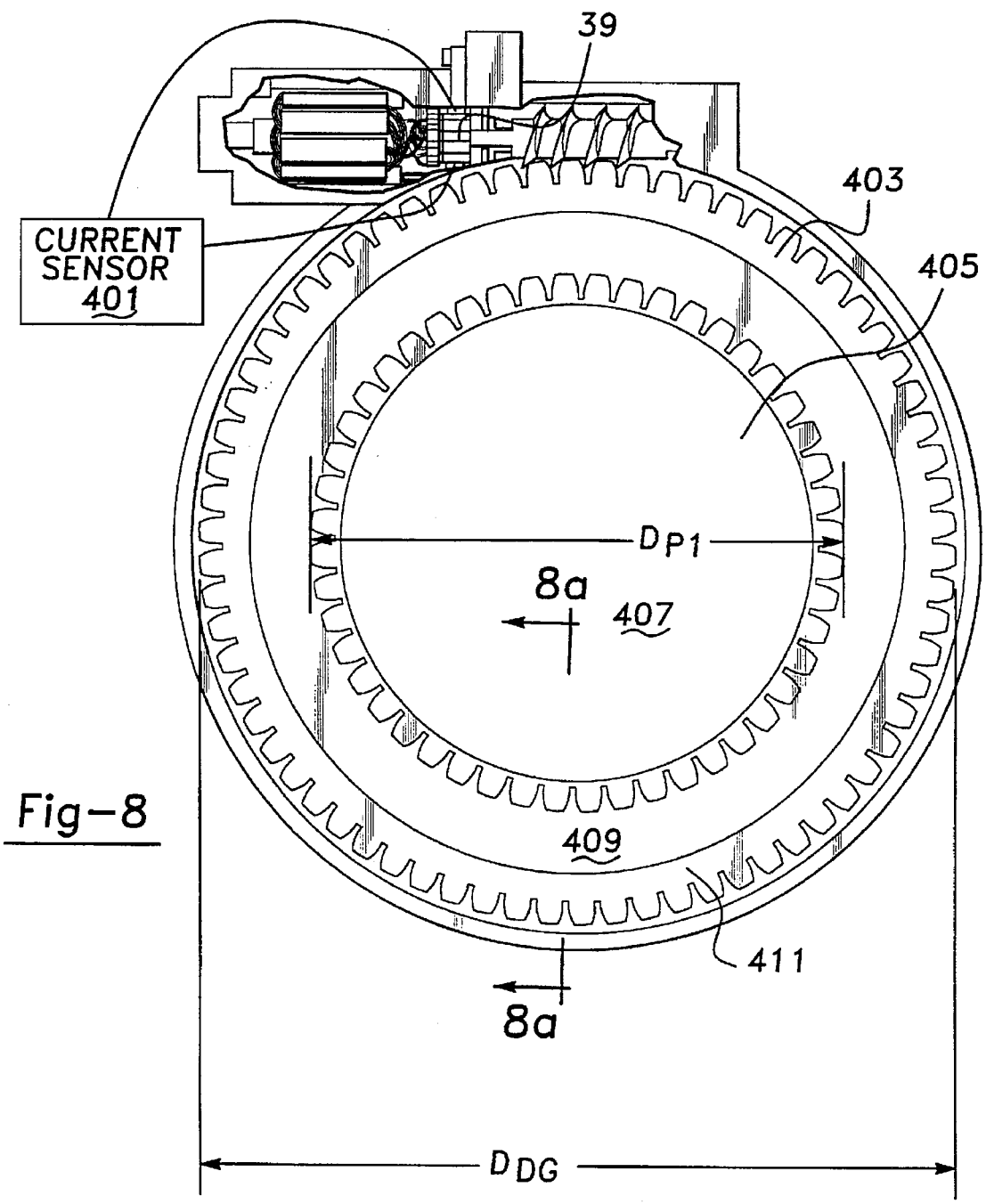
FIG. 8 is a diagrammatic view showing an alternate embodiment apparatus of the present invention.

Gear No. 1 - A conventional arrangement as listed in Table 1.
Gear No. 2 - A solid hub, web, and rim arrangement (as shown in FIG. 8) with the pinion gear size increased and the motor horsepower reduced.
Gear No. 5 - The present invention as listed in Table 1 and shown in FIGS. 2-4.
Gear Nos. 3, 4, 5, 6 - The present invention with a gear having a hollow hub with annular spacing as shown in FIGS. 2-4.
*Approximate Speed
**Note all gear teeth have identical size and shape.

The present invention system, which employs the enlarged diameter driven and pinion gears 147 in combination with the reduced size motor 13, is also well suited for automotive vehicle powered moving panels such as door windows, sunroof windows, sliding minivan doors or the like. These powered moving panels must meet FMVSS 118 which mandates that the motor must stall at twenty-two pounds of force in order to prevent occupant finger pinching. Therefore, as can be observed in FIG. 8, an electrical current sensor 401 is electrically connected to commutator 39 of motor 13 by way of brushes for sensing if a sudden current rise is present (excluding initial energization and deenergization current spikes) which indicate that the closure force and motor torque has increased. Thus, the motor can be deenergized and/or reversed. Sensor 401 can be a voltage divider, resistor or the like, which operates in conjunction with a mosfet or microprocessor electrically connected therewith. An enlarged diameter ("$D_{DG}$") of driven gear 403 and an enlarged diameter ("$D_P$") of pinion gear 405, shown in FIG. 8 as having a solidly and integrally formed hub 407, laterally central web 409 and rim 411, allow for slower rotational speeds of the gears 403 and 405 and commutator 39. These slower rotational speeds further provide the ability to more accurately sense motor induced current rises as a relation of time and panel movement distance. Depending upon the specific application, the larger diameter gears 403 and 405 and smaller motor 13 are sized in accordance with the theoretical calculations of Table 1.

Referring to FIGS. 2 and 8, the size relations of the driven gear 403 and motor 13 can be characterized as follows:

$D_{DG} < (1.5)(D_P)$, where "$D_P$" is the diameter of the pinion gear 405. Accordingly, an outer diameter $D_{DG}$ of the driven gear 403 is less than one and one-half times the outer diameter $D_P$ of the pinion gear 405 while the relationship between the armature housing volume divided by the outer diameter $D_{DG}$ of the driven gear 403 is less than two inches squared. Although it is preferable to provide a large cylindrical opening 181 (see FIG. 4) within the driven gear housing 61 and hub 71 in order to save weight, it is also envisioned that the presently discussed alternate gears may not necessarily need this opening to realize the size and speed relationships and advantages of the present invention.

While the preferred embodiment of this stress dissipation apparatus has been disclosed, it will be appreciated that various modifications may be made without departing from the present invention. For example, the nodule construction disclosed can be employed with other hub and rim configurations. Furthermore, the pinion gear teeth 149 can be integrally formed upon the hub 71. Also, the hub 71 need not be necessarily offset from the rim 77. A more centralized web may alternately be employed between the hub and rim, instead of outer antibuckling plates, while harnessing the other novel aspects of the present invention. Many other snap-fit means, such as separated cantilevered beams, tongue and groove formations, dovetail formations, rounded barbs or squared barbs can also be provided. Various materials have been disclosed in an exemplary fashion, however, other materials may of course be employed. It is intended by the following claims to cover these and any other departures from the disclosed embodiments which fall within the true spirit of this invention.

The invention claimed is:

1. A rotatable apparatus comprising:

a hub having a section coaxial with a rotational axis;

a first annular plate projecting radially outward from said hub;

a second plate being offset from and having a plane substantially parallel to a plane of said first plate;

an annular rim coaxially aligned with and outwardly disposed from said hub, said rim being coupled to said first plate;

a rotational stress dissipation device being joined to said rim and to at least one of said plates; and a hollow and substantially annular cavity being disposed between said plates;

said hub, rim and plates being injection molded from an inherently lubricous polymeric material such that relative movement therebetween has reduced friction.

2. The rotatable apparatus of claim 1 wherein:

said first plate is integrally formed as part of said hub; and said second plate is integrally formed as part of said rim.

3. The rotatable apparatus of claim 2 wherein a section of said hub outwardly extends from an outside face of said first plate such that said section of said hub and at least a majority portion of said rim are laterally offset from each other.

4. The rotatable apparatus of claim 3 further comprising:

a set of pinion gear teeth radially extending outward from said section of said hub; and a set of rim gear teeth radially extending outward from said rim.

5. A rotatable apparatus comprising:

a hub having a section coaxial with a rotational axis;

a first annular plate projecting radially outward from said hub;

a second plate being offset from and having a plane substantially parallel to a plane of said first plate;

an annular rim coaxially aligned with and outwardly disposed from said hub, said rim being coupled to said first plate;

a rotational stress dissipation device being joined to said rim and to at least one of said plates;

a hollow and substantially annular cavity being disposed between said plates; and a snap-fit extending from at least one of said plates engaging a snap-fit receptacle of at least the other of said plates.

6. A rotatable apparatus comprising:

a hub having a section coaxial with a rotational axis;

a first annular plate projecting radially outward from said hub;

a second plate being offset from and having a plane substantially parallel to a plane of said first plate;

an annular rim coaxially aligned with and outwardly disposed from said hub, said rim being coupled to said first plate;

a rotational stress dissipation device being joined to said rim and to at least one of said plates;

a hollow and substantially annular cavity being disposed between said plates; and a substantially cylindrical leg inwardly extending from said inside face of one of said plates, said leg being concentrically and coaxially aligned with said rotational axis, said leg separating said rotational stress dissipating member from said hollow cavity.

7. A rotatable apparatus comprising:

a hub having a section coaxial with a rotational axis;

a first annular plate projecting radially outward from said hub;

a second plate being offset from and having a plane substantially parallel to a plane of said first plate;

an annular rim coaxially aligned with and outwardly disposed from said hub, said rim being coupled to said first plate;

a rotational stress dissipation device being joined to said rim and to at least one of said plates;

a hollow and substantially annular cavity being disposed between said plates;

a gear housing having a cup shape defined by a substantially cylindrical interior wall, a substantially cylindrical exterior wall and a substantially annular bottom wall;

said interior wall of said gear housing acting as a rotational bearing surface for said hub; and an inner surface of said gear housing interior wall located closest to said rotational axis defining a substantially cylindrical opening with a diameter relatively larger than a radial distance measured between said hub and said rim along one side of said rotatable apparatus.

8. A rotatable apparatus comprising:

a hub having a section coaxial with a rotational axis;

a first annular plate projecting radially outward from said hub;

a second plate being offset from and having a plane substantially parallel to a plane of said first plate;

an annular rim coaxially aligned with and outwardly disposed from said hub, said rim being coupled to said first plate;

a rotational stress dissipation device being joined to said rim and to at least one of said plates;

a hollow and substantially annular cavity being disposed between said plates;

said rotational stress dissipation device including:

nodule means depending from at least one member taken from the group consisting of: said hub, said first plate, said second plate and said rim; and resilient means for reducing different rotational movements between said hub and said rim, said resilient means acting against said nodule means, said resilient means being clear of an annular area disposed between at least one of said plates and said rim.

9. A rotatable apparatus comprising:

a hub having a section coaxial with a rotational axis;

a first annular plate projecting radially outward from said hub;

a second plate being offset from and having a plane substantially parallel to a plane of said first plate;

a rim coaxially aligned with and outwardly disposed from said hub, said rim being coupled to said first plate;

a rotational stress dissipation device being joined to said rim and to at least one of said plates; and a leg laterally extending from a middle segment of one of said plates and being directly affixed to the other of said plates.

10. The rotatable apparatus of claim 9 wherein said first plate rotatable moves with said hub and said second plate rotatably moves with said rim, said first plate is coupled to said rim but can rotatably move relative to said rim, said first plate can rotate relative to said second plate and is not rotatably limited by affixation of said leg therebetween.

11. The rotatable apparatus of claim 10 further comprising:

a first snap-fit attachment joining said leg of said one of said plates to said other of said plates; and a second snap-fit joining said first plate to said rim.

12. The rotatable apparatus of claim 9 wherein said leg of said one of said plates has a substantially cylindrical configuration concentric with said rim with said stress dissipating structure disposed within an annular channel defined between said plates and between said rim and said leg.

13. The rotatable apparatus of claim 12 further comprising:

a set of pinion gear teeth radially extending outward from said section of said hub; and a set of rim gear teeth radially extending outward from said rim.

14. The rotatable apparatus of claim 9 wherein said rotational stress dissipation device includes:

nodule means depending from at least one member taken from the group consisting of: said hub, said first plate, said second plate and said rim; and resilient means for reducing different rotational movements between said hub and said rim, said resilient means acting against said nodule means, said resilient means being clear of an annular area disposed between at least one of said plates and said rim.

15. A rotatable apparatus comprising:

an inner member including a hub;

a first set of nodules extending radially outward from said inner member, each of said first set of nodules having a proximal end located closest to a rotational axis and having an opposite distal end, said proximal end of each of said first set of nodules having a relatively constricted rotational direction dimension as compared to an expanded rotational direction dimension at said distal end with first and second tapered surfaces extending between said proximal and distal ends;

an outer member including a rim;

a second set of nodules radially extending inward from said outer member, each of said second set of nodules having a proximal end located closest to said rim and having an opposite distal end, said distal end of each of said second set of nodules having a relatively constricted rotational direction dimension as compared to an expanded rotational direction dimension at said proximal end with third and fourth tapered surfaces extending between said proximal and distal ends; and resilient means for reducing rotational differential movement disposed between said first and second sets of nodules, said resilient means also being disposed between said distal ends of at least one set of said nodules and at least an adjacent one of said members.

16. The rotatable apparatus of claim 15 further comprising a first set of geared teeth outwardly extending from said rim.

17. The rotatable apparatus of claim 16 further comprising a second set of geared teeth extending from said hub.

18. The rotatable apparatus of claim 15 wherein said resilient means includes a shock absorbing and resilient elastomeric material disposed between each adjacent pair of said sets of nodules, the amount of taper of each of said nodules and the amount of elastomeric material ("E") disposed between each pair of adjacent nodules can be substantially characterized by the following formula:

$$\frac{E_2}{E_1} = \frac{D_2}{D_1}$$

where $E_2$ is a rotational direction dimension between said proximal end of one of said second set of nodules and said distal end of an adjacent one of said first set of nodules;

$E_1$ a rotational direction dimension between said distal end of said one of said second set of nodules and said proximal end of said adjacent one of said first set of nodules; and $D_2$ is a diameter of said rim teeth and $D_2$ is a diameter of said hub teeth;

whereby generally uniform strain is imparted upon said elastomeric material during deformation due to differing rotational movement between said rim and said hub.

19. A rotatable apparatus comprising:

an inner member including a hub;

a first set of nodules extending radially outward from said inner member, each of said first set of nodules having a proximal end located closest to a rotational axis and having an opposite distal end, said proximal end of each of said first set of nodules having a relatively constricted rotational direction dimension as compared to an expanded rotational direction dimension at said distal end with first and second tapered surfaces extending between said proximal and distal ends;

an outer member including a rim;

a second set of nodules radially extending inward from said outer member, each of said second set of nodules having a proximal end located closest to said rim and having an opposite distal end, said distal end of each of said second set of nodules having a relatively constricted rotational direction dimension as compared to an expanded rotational direction dimension at said proximal end with third and fourth tapered surfaces extending between said proximal and distal ends; and resilient means for reducing rotational differential movement disposed between said first and second sets of nodules;

wherein said inner member includes a first annular anti-buckling plate securely affixed to said hub and being disposed laterally outward of said sets of nodules.

20. The rotatable apparatus of claim 19 wherein said outer member further includes a second annular anti-buckling plate securely affixed to said rim and being disposed laterally outward of said sets of nodules.

21. A stress dissipation apparatus comprising:

an armature housing having a longitudinal dimension and transverse dimensions;

a rotatable armature with wire windings being internally disposed and journalled within said armature housing;

at least one permanent magnet being internally disposed within said armature housing adjacent to said armature;

a rotatable armature shaft extending from said armature, a gear segment being disposed along a portion of said armature shaft; and a gear including a hub, a rim and means for dissipating rotational movement differences between said hub and said rim, said hub having a set of geared teeth, said rim having a set of geared teeth for enmeshing with said gear segment;

wherein said rim teeth have an outer diameter less than one and one-half times an outer diameter of said hub teeth whereby a relatively smaller motor can be employed to drive a relatively larger diameter gear, as compared to conventional motors and gears, such that improved driving output forces per pound of material efficiencies are achieved.

22. The stress dissipation apparatus of claim 21 wherein said means for dissipating rotational movement differences includes:

a first set of nodules moving with said hub;

a second set of nodules moving with said rim; and a resilient member disposed between adjacent pairs of said sets of nodules.

23. The stress dissipation apparatus of claim 22 wherein said resilient member is an elastomeric material.

24. The stress dissipation apparatus of claim 21 wherein said gear further includes:

a first antibuckling plate spanning between said hub and said rim; and a second antibuckling plate spanning between said hub and said rim.

25. The rotatable apparatus of claim 21 further comprising:
   a gear housing having a cup shape defined by a substantially cylindrical interior wall, a substantially cylindrical exterior wall and a substantially annular bottom wall;
   said interior wall of said gear housing acting as a rotational bearing surface for said hub; and
   an inner surface of said gear housing interior wall located closest to said rotational axis defining a substantially cylindrical opening with a diameter relatively larger than a radial distance measured between said hub and said rim along one side of said rotatable apparatus.

26. The stress dissipation apparatus of claim 21 further comprising a window lift mechanism for an automotive vehicle being movably driven by rotation of said hub.

27. A gear comprising:
   a primary hub having a set of outwardly extending teeth;
   an auxiliary hub being offset and separately formed in relation to said primary hub;
   a rim concentrically surrounding said auxiliary hub; said rim being coaxially aligned with said primary hub; and
   said auxiliary hub rotating in concert with said rim but being adapted to be rotatable a different amount than said primary hub.

28. The gear of claim 27 further comprising means for reducing rotational differential movement coupling said rim to primary hub.

29. The gear of claim 28 wherein said means for reducing rotational differential movement includes:
   a first set of nodules moving with said primary hub;
   a second set of nodules moving with said rim; and
   resilient means disposed between said sets of nodules.

30. The gear of claim 27 further comprising at least one curved projection inwardly extending from at least one of said hubs acting as a bearing surface against an adjacent gear housing.

31. An apparatus comprising:
   an armature housing having a longitudinal dimension and transverse dimensions;
   a rotatable armature with wire windings being internally disposed and journalled within said armature housing;
   at least one permanent magnet being internally disposed within said armature housing adjacent to said armature;
   a rotatable armature shaft extending from said armature, a gear segment being disposed along a portion of said armature shaft;
   a driven gear including a hub and a rim, said hub having a driving interface, said rim having a set of geared teeth for enmeshing with said gear segment;
   a gear housing having a cup shape defined by a substantially cylindrical interior wall, a substantially cylindrical exterior wall and a substantially annular bottom wall;
   said interior wall of said gear housing acting as a rotational bearing surface for said hub; and
   an inner surface of said gear housing interior wall located closest to said rotational axis defining a substantially cylindrical opening with a diameter relatively larger than a radial distance measured between said hub and said rim along one side of said driven gear;
   wherein said rim has an outer diameter less than one and one-half times an outer diameter of said hub driving interface whereby a relatively smaller motor can be employed to drive a relatively larger diameter gear, as compared to conventional motors and gears.

32. The apparatus of claim 31 further comprising a polymeric annular plate spanning between members including said hub and said rim, at least one edge of said plate being movable relative to at least one of said members, said plate having a substantially uniform thickness dimension less than a radius dimension of said plate.

33. The apparatus of claim 31 further comprising a window lift mechanism for an automotive vehicle being movably driven by rotation of said driving interface engaged therewith.

34. The apparatus of claim 31 further comprising means for dissipating rotational movement differences between said hub and said rim.

35. The apparatus of claim 31 further comprising a web integrally formed as part of and rotationally joined to said hub and said rim.

36. The gear of claim 31 wherein said armature shaft rotates at a speed less than 4,000 revolutions per minute and said rim rotates at a speed less than 80 revolutions per minute while hub driving interface torque of at least 100 inch-pounds is produced.

37. In combination, an automotive vehicle electric dc motor and gear system comprising:
   an armature housing having a longitudinal dimension and transverse dimensions;
   a rotatable armature with wire windings being internally disposed and journalled within said armature housing;
   at least one permanent magnet being internally disposed within said armature housing adjacent to said armature;
   a rotatable armature shaft extending from said armature, a gear segment being disposed along a portion of said armature shaft;
   a gear including a hub, a rim and a web spanning between said hub and said rim, said rim having a set of geared teeth for enmeshing with said gear segment of said armature shaft;
   a gear housing having a cup shape defined by a substantially cylindrical interior wall, a substantially cylindrical exterior wall and a substantially annular bottom wall;
   said interior wall of said gear housing acting as a rotational bearing surface for said hub;
   an inner surface of said gear housing interior wall located closest to said rotational axis defining a substantially cylindrical opening with a diameter relatively larger than a radial distance measured between said hub and said rim along one side of said rotatable apparatus; and
   said hub, rim and web being formed to rotate as a single piece;
   wherein said rim has an outer diameter less than one and one-half times an outer diameter of said hub whereby a relatively smaller motor can be employed to drive a relatively larger diameter gear, as compared to conventional motors and gears.

38. The combination of claim 37 further comprising a current sensor electrically connected to a commutator rotating with said armature shaft, said current sensor causing said motor to be deenergized if motor torque suddenly increases.

39. The combination of claim 37 wherein said armature shaft rotates at a speed less than 4,000 revolutions per minute and said gear rotates at a speed less than 80 revolutions per minute while pinion teeth torque of at least 100 inch-pounds is produced.

40. In combination, an automotive vehicle electric dc motor and gear system comprising:

an armature housing having a longitudinal dimension and transverse dimensions thereby defining an inner volume;

a rotatable armature with wire windings being internally disposed and journalled within said armature housing;

at least one permanent magnet being internally disposed within said armature housing adjacent to said armature;

a rotatable armature shaft extending from said armature, a gear segment being disposed along a portion of said armature shaft;

a driven gear including a hub, a rim and a member spanning between said hub and said rim, said rim having a first set of geared teeth for enmeshing with said gear segment of said armature shaft; and a pinion gear rotating with said hub and having a second set of geared teeth;

wherein said driven gear has an outer diameter that is less than one and one-half times that of an outer diameter of said pinion gear and the volume of said armature housing divided by said outer diameter of said driven gear is less than two inches squared.

41. The combination of claim 40 further comprising a current sensor electrically connected to a commutator rotating with said armature shaft, said current sensor causing said motor to be deenergized if motor torque suddenly increases.

* * * * *